UNITED STATES PATENT OFFICE.

JACOB B. ZOOK, OF XENIA, INDIANA.

ROOF-PAINT.

SPECIFICATION forming part of Letters Patent No. 447,997, dated March 10, 1891.

Application filed November 10, 1890. Serial No. 370,952. (No specimens.)

*To all whom it may concern:*

Be it known that I, JACOB B. ZOOK, a citizen of the United States, residing at Xenia, in the county of Miami and State of Indiana, have invented a new and useful Roof-Paint, of which the following is a specification.

My invention relates to an improvement in paints; and it has for its objects to provide a paint that will hold its color on wood, iron, and tin, that will give a high polish, and at the same time provide a paint that will be unaffected by the changes of temperature, expanding and contracting, respectively, thus avoiding the liability to crack or scale.

This paint is especially efficient on wood roofs, giving a hard slate-like surface impervious to water and entirely fire-proof, while at the same time in shingle roofings drying between the interstices it holds them to their places, and thus additionally serves as a retaining medium.

The above paint is composed of the following: coal-tar, oxide of iron, slate, chip rubber, asbestus, polish composed of rosin, benzine, crude carbolic acid, lamp-black, and asphaltum, creosote, benzine, and turpentine, which are mixed together in the following proportions: coal-tar, one barrel; oxide of iron, fifteen pounds; slate, fifteen pounds; chip rubber, twenty pounds; asbestus, ten pounds; polish, composed of rosin, benzine, crude carbolic acid, lamp-black, and asphaltum, two quarts; creosote, one gallon; turpentine, one gallon; benzine, sufficient to thin.

The above ingredients are thoroughly mixed together in the ordinary mechanical manner, the slate being ground to a fine powder before admixture with the other ingredients, and the completed mixture, as the paint itself, is applied in the manner of applying paints in general.

Having thus described my invention, what I claim, and desire to secure by Letters Patent, is—

A paint composed of the following elements, namely: coal-tar, oxide of iron, slate, chip rubber, asbestus, polish composed of rosin, benzine, crude carbolic acid, lamp-black, and asphaltum, creosote, benzine, and turpentine, which are mixed in substantially the proportions specified.

In testimony that I claim the foregoing as my own I hereto affix my signature in presence of two witnesses.

JACOB B. ZOOK.

Witnesses:
JOHN O. FRAME,
CHARLES SPIFER.